B. SCHÜTTE.
SLIP SHACKLE.
APPLICATION FILED DEC. 22, 1913. RENEWED MAR. 30, 1915.

1,158,392.

Patented Oct. 26, 1915.

Witnesses:

Inventor:

UNITED STATES PATENT OFFICE.

BERNHARD SCHÜTTE, OF HASBERGEN, GERMANY.

SLIP-SHACKLE.

1,158,392. Specification of Letters Patent. Patented Oct. 26, 1915.

Application filed December 22, 1913, Serial No. 808,209. Renewed March 30, 1915. Serial No. 18,181.

*To all whom it may concern:*

Be it known that I, BERNHARD SCHÜTTE, a subject of the Grand Duke of Oldenburg, residing at Hasbergen, in the Grand Duchy of Oldenburg, German Empire, have invented certain new and useful Improvements in Slip-Shackles, of which the following is a specification.

This invention relates to a slip shackle, the construction of which is improved by the addition of an angle lever to the free arm of which a curved lever is hinged, which is guided on the end of the hook by means of a pin of the hook engaging with a slot of the lever so that, when the angle lever is lowered the cable is slowly lifted so that it can slip off the shackle. The improved slip hook is fork-shaped and the free arm of the operating lever and the lifting lever for the cable are mounted between the two arms of the fork-shaped hook.

In the accompanying drawings the invention is shown by way of example.

Figure 1:
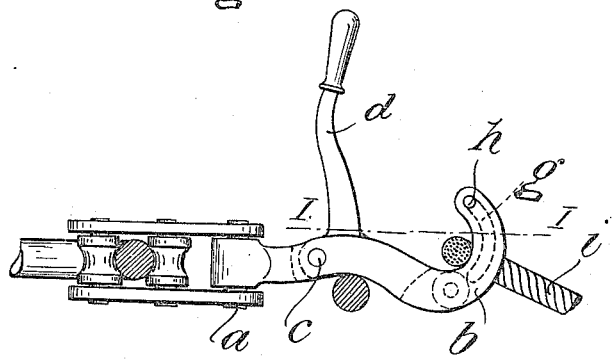
Figure 2:
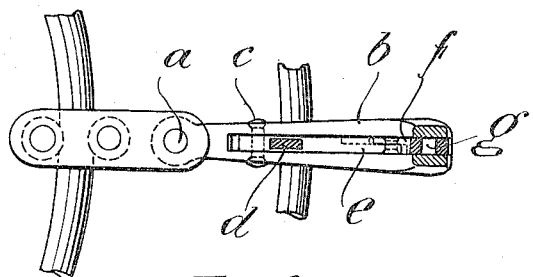
Figure 3:
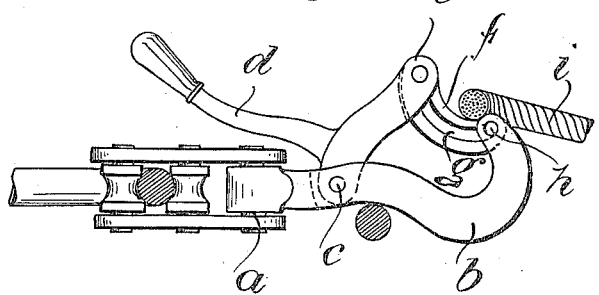

Figure 1 is a side elevation of the slip shackle. Fig. 2 is a side view of Fig. 1. Fig. 3 illustrates the operation of the slip shackle.

The slip shackle $b$ is pivotally mounted in the well known manner. In the shaft of the slip hook a cross bolt $c$ is mounted on which the angle lever $d$ is pivoted. At the free end of this angle lever $d$ a curved lever $f$ is hinged the shape of which corresponds with the shape of the hook. The curved lever $f$ has a slot $g$ mounted on a cross bolt $h$ secured in the front end of the hook $b$. If the lever $d$ is lowered the cable $i$ is lifted by the curved lever $f$ whereby the slipping of the cable is considerably facilitated. The hook $b$ is preferably fork-shaped and the angle lever $d$ and the curved lifting lever $f$ are mounted between the arms of the fork-shaped hook.

The slip shackle is not only designed to be used on ships but also on railways or the like.

I claim:—

1. An improved slip shackle comprising in combination with the shackle hook proper, a cross bolt in the shaft of said hook, an angle lever pivotally mounted on said cross bolt, a curved lever corresponding in shape with the shape of the hook hingedly connected with one end of the angle lever and having a curved slot, a cross bolt fixed in the end of the hook for guiding said curved lever, substantially as described and shown and for the purpose set forth.

2. An improved slip shackle comprising in combination a fork-shaped slip hook, a cross bolt in the shaft of said hook, an angle lever pivotally mounted on said cross bolt and situated between the arms of the fork-shaped hook, a cross bolt in the front end of the hook, a curved lever having a slot hingedly connected with the free end of said angle lever and guided on said front cross bolt, substantially as described and shown and for the purpose set forth.

In witness whereof I have hereunto set my hand in the presence of two witnesses.

BERNHARD SCHÜTTE.

Witnesses:
HANS MEISSNER,
WILHELM STRUP.